United States Patent

[11] 3,586,142

| [72] | Inventors | Russell A. Inwood<br>Rockford;<br>Delbert L. Rector, Belmont; James R. Timmons, Grand Rapids, all of, Mich. |
|---|---|---|
| [21] | Appl. No. | 820,833 |
| [22] | Filed | May 1, 1969 |
| [45] | Patented | June 22, 1971 |
| [73] | Assignee | Rapistan Incorporated<br>Grand Rapids, Mich. |

[54] RAIL FOR RACKS AND THE LIKE
3 Claims, 5 Drawing Figs.

[52] U.S. Cl.................................................. 193/35,
                                                          193/37
[51] Int. Cl.......................................................... B65g 13/00
[50] Field of Search............................................ 193/35, 35
   A, 35 SS, 35 C, 35 TE, 35 F, 35 MD, 35 J, 35 G, 35
                                                          B, 35 S, 37

[56] References Cited
UNITED STATES PATENTS

| 2,827,153 | 3/1958 | Olk et al. ...................... | 193/35 |
| 2,964,154 | 12/1960 | Erickson ...................... | 193/35 |
| 2,964,155 | 12/1960 | Flowers et al................. | 193/35 |
| 3,420,348 | 1/1969 | Caudell et al................. | 193/35 |

Primary Examiner—Andres H. Nielsen
Attorney—Price, Heneveld, Huizenga & Cooper

ABSTRACT: This disclosure relates to a rail for lightweight storage and the like. The rail has a plurality of axle containing rollers or wheels removably fixed in a U-shaped support through sockets formed in the sides of the support. Indented portions of the sockets provide a snap-fit engagement for removably securing each individual wheel within its socket.

PATENTED JUN22 1971  3,586,142
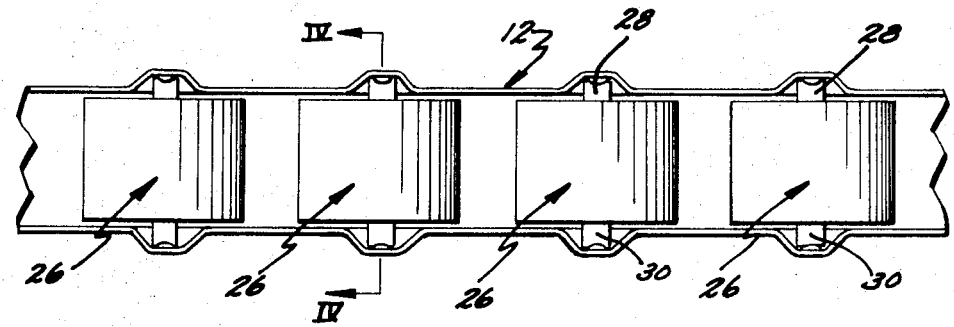
FIG.2.
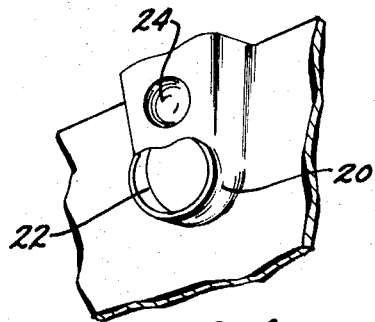
FIG.4.
FIG.3.
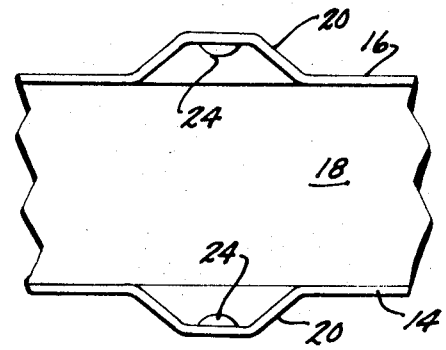
FIG.5.
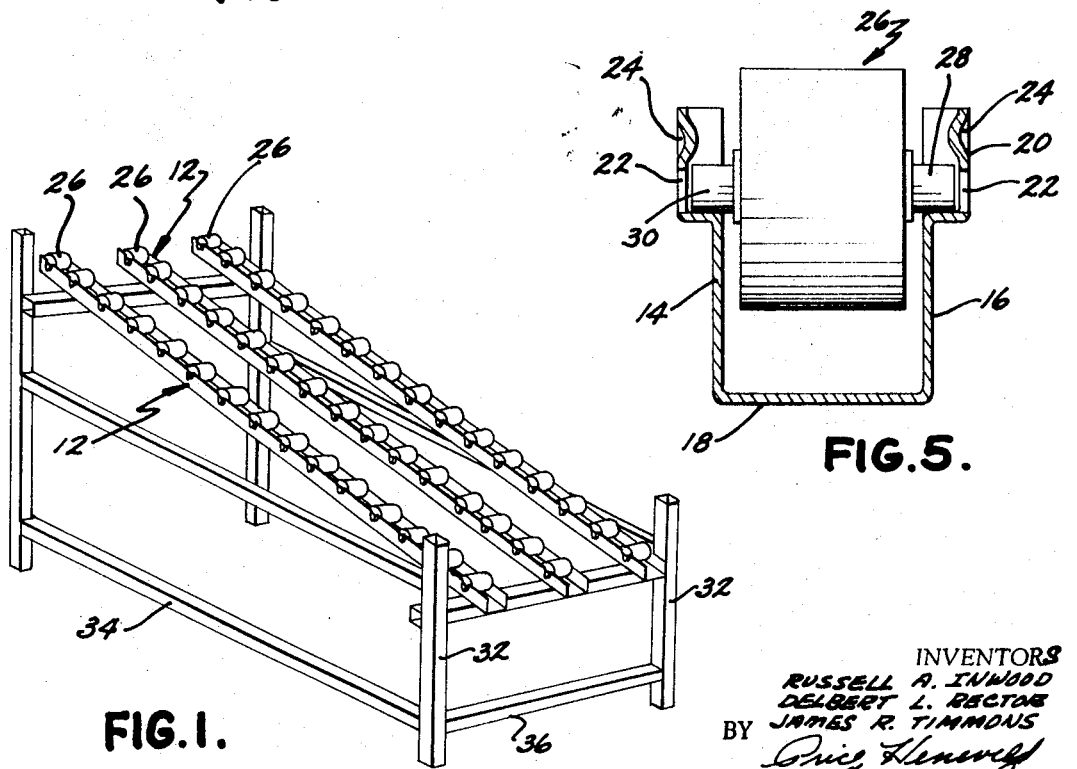
FIG.1.
INVENTORS
RUSSELL A. INWOOD
DELBERT L. RECTOR
BY JAMES R. TIMMONS
ATTORNEYS

RAIL FOR RACKS AND THE LIKE

This invention relates to rails for storing and conveying articles. In one of its aspects the invention relates to a rail for storage racks and conveyors, the rail having a support member and a plurality of rollers or wheels with axles in snap-fit engagement with pockets formed in the sides of the support member.

St. Armour, U.S. Pat. No. 3,063,534, discloses a storage unit in which a plurality of racks are angularly disposed relative to the horizontal for storage of articles. Certain racks are formed with rails having rollers. Spindles on the rollers are seated in the recesses formed in the sidewalls of the rails. The tops of the rails are rolled over the spindles after positioning the spindles in the recesses to retain the rollers within the rail. This forming procedure permanently fixes the wheels in place in the rails, making removal very difficult if not impossible.

We have now discovered an improved rail and track system for lightweight conveyors and the like wherein wheels in a simple support member are removably secured to the rails for easy and rapid replacement of the wheels.

By various aspects of this invention, one or more of the following, or other, objects can be obtained.

It is an object of this invention to provide a simple and efficient roller rail for storage racks and the like, in which said wheels are easily assembled and replaced.

It is a further object of this invention to provide an improved roller rail for conveyors and the like wherein the ease of manufacture is coupled with a simple and inexpensive replacement of breakable parts.

Other aspects, objects, and the several advantages of this invention are apparent to one skilled in the art from a study of this disclosure, the drawings, and the appended claims.

According to the invention, there is provided a rail for storage racks, conveyors and the like. The rail has a longitudinal support member having opposing sidewalls and axle supporting sockets formed therein. Wheels, which fit between the sidewalls extend above the top of the sidewalls and have outwardly extending axles journaled in the sockets. Detent means are formed in the sockets above the axles to hold the axles in snap-fit engagement in the sidewalls.

The invention will now be described with reference to the accompanying drawings in which:

FIG. 1 is a perspective view of a rack containing the rails of the invention;

FIG. 2 is a plan view of a rail according to the invention;

FIG. 3 is a fragmentary, enlarged plan view of the rail shown in FIG. 2 without the rollers;

FIG. 4 is a fragmentary, perspective side view of the rail illustrated in FIGS. 2 and 3 with the detail of the sockets more clearly illustrated; and FIG. 5 is a sectional view taken along lives V-V of FIG. 2.

Referring now to the drawings, there is shown a storage rack having uprights 32, side braces 34 and cross braces 36. Rails, formed from a U-shaped support member 12 having sidewalls 14 and 16 joined by a bottom wall 18 are supported by the rack. The racks can be identical to those disclosed and claimed in U.S. Pat. No. 2,786,578 which is incorporated herein by reference. The U-shaped support member is formed of a metal, preferably steel, so that the U-shaped support is rigid. Formed in each sidewall are socket forming pockets 20 having holes 22 at the lower outer portion thereof. The holes 22 are nonfunctional when the rail is in use. They are provided during the manufacture of the rail to facilitate the stretching of the metal during the forming of the pockets. The provision of these openings permits the use of heavier gauge metal for the rails and, thus, a stronger rail. The pockets have a rounded bottom forming the socket or axle seat and extend substantially vertically upwardly therefrom forming inwardly facing channels. Indentations 24 are formed in the upper outer portion of the pockets 20 and retain axles 28 and 30 of wheel members 26 which are positioned in the sockets.

The wheels 26 and the axles 28 and 30 are preferably formed of a self-lubricating plastic material such an Nylon, Delrin, polyvinyl chloride, polyethylene, polypropylene and the like. Other plastics such as polyesters can also be used.

The rail of the invention provides a snap-fit engagement of the axles 28 and 30 within the sockets formed by pockets 20. The indentations 24 retain the axle in the lower portion of the pockets 20 but are yieldable to permit removal of the axles vertically upwardly when it is desirable to replace them.

The rail is easily manufactured from a single piece of sheet metal by forming the pockets first and then bending the sheet into a U-shape. However, such a manufacturing technique is merely exemplary because others are available for the same purpose. The wheels are then simply snapped into place in the sockets. When a wheel becomes worn or broken, the wheels are replaced by merely pulling upwardly on the wheels which will pop the wheel out of the socket. The replacement wheel is then pushed into the socket in the same manner as the original wheel was inserted into the socket. The rail according to the invention can be made in various lengths and sizes. The rail finds particular utility in storage racks such as that disclosed in the above-mentioned St. Armour patent.

A conveyor is constructed according to the invention by providing at least two of the rails described above in spaced relationship with the rails being joined by cross members (not shown) in a conventional manner.

Further, storage racks can be made with the rails of the invention. The storage racks can be formed from upright members and brace members joined together forming a matrix box structure as illustrated in the St. Armour patent. Spaced rail members as above described are then fixed to the brace members and extend inwardly or away from an edge of the matrix box structure at different horizontal levels thereof.

The pockets 20 of the rail provide a smooth bearing surface for the wheel axles so that the axles' bearing surfaces are not scarred by the metal during operation. Further, the placement of the indentations 24 in the end of the sockets avoids scarring of the plastic wheel axle bearing surface during insertion of the wheels into their respective sockets.

The position of the indentations in the end of the sockets permits the required displacement for insertion of the wheels to be absorbed by the sidewalls of the U-shaped rails without exceeding the elastic limit of the metal. The springing action required for insertion and removal of the wheels is easily provided by the sidewalls.

Reasonable variation and modification are possible within the scope of the foregoing disclosure and drawings without departing from the spirit of the invention.

The embodiments of the invention in which we claim an exclusive property or privilege are defined as follows.

1. In a rail for storage racks, conveyors and the like, wherein said rail comprises: a longitudinal support member having oppositely disposed sidewalls; sockets formed in each of said sidewalls in spaced relationship therealong with the sockets of one of said sidewalls being aligned laterally of said rail to sockets in the other of said sidewalls; said sockets opening through the top of said rail; and wheels being positioned in spaced relationship between said sidewalls, each wheel having outwardly extending axles journaled in opposite ones of said sockets in said sidewalls, the improvement which comprises: each of the sockets being formed by outward deformation of a portion of said sidewalls, said outwardly deformed portion of the material of said sidewalls at the bottom of each of said sockets being shaped into an outwardly projecting rounded axle supporting saddle; detent means in one of said sidewalls above at least one of said axles of each wheel to permit snap-fit insertion and removal of each of said wheels and to retain said wheels when said axles are seated on said saddles.

2. A rail as described in claim 1 wherein the outwardly deformed socket forming portion of said rails is apertured at each socket with the material at said aperture being deformed outwardly and downwardly to form said saddle.

3. A rail according to claim 7 wherein said sidewalls project vertically and the top of said rail is formed by the upwardly facing edges of said sidewalls.